R. B. Musson. Lamp Chimney Cleaner.
No. 72072
PATENTED
DEC 10 1867
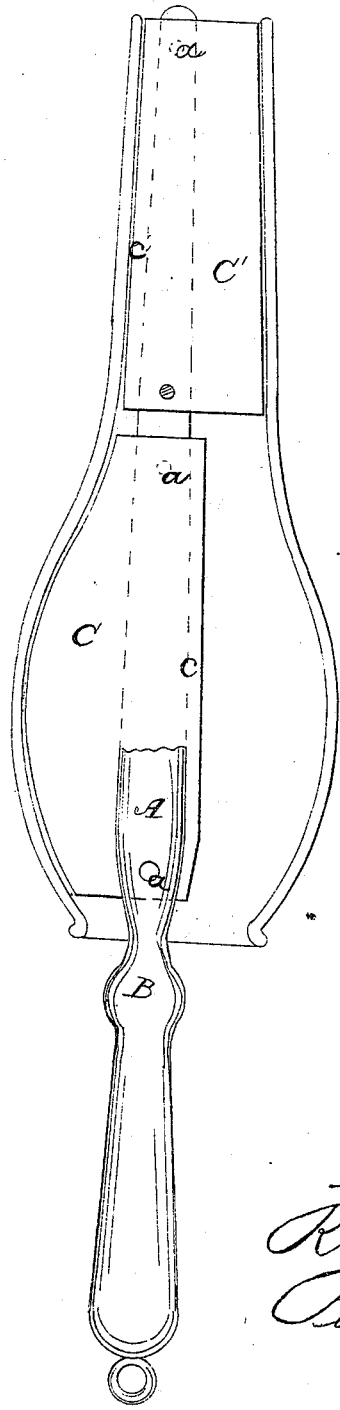
Witnesses.
Theo Tische
Wa Trewin
Inventor:
R. B. Musson
Per Munn & Co
Attorneys

United States Patent Office.

R. B. MUSSON, OF CHAMPAIGN, ILLINOIS.

Letters Patent No. 72,072, dated December 10, 1867.

IMPROVEMENT IN CLEANERS FOR LAMP-CHIMNEYS.

The Schedule referred to in these Letters Patent and making part of the same.

TO ALL WHOM IT MAY CONCERN:

Be it known that I, R. B. MUSSON, of Champaign, in the county of Champaign, and State of Illinois, have invented a new and Improved Cleaner for Lamp-Chimneys, &c.; and I do hereby declare that the following is a full, clear, and exact description thereof, which will enable those skilled in the art to make and use the same, reference being had to the accompanying drawings, forming part of this specification.

This invention relates to an improved cleaner for lamp-chimneys, bottles, and other hollow-ware.

This cleaner consists of one or more strips of rubber, or other soft elastic substance, shaped so as to conform or adjust itself to the interior walls of the article to be cleaned, and secured in a suitable holder.

The accompanying drawing is a front view, partly in section, of my improved cleaner.

Similar letters of reference indicate corresponding parts.

A, in the drawing, represents the holder to my improved cleaner. This holder, in the present instance, is made of wood, suitably turned at one end to form a handle, B, and from the other end, toward said handle, split down a portion of its length. C and C' are wings or strips of rubber, inserted in the split portion of the holder, and secured by the screws $a\ a$, or by other suitable fastenings. These strips extend nearly the whole length of the glass to be cleaned, and project on both sides from said holder. The projection of strip C, on one side of the holder, is shaped to the interior wall of the bulging or globular portion of the chimney, and the other strip, C', on the side opposite to C, is shaped to the glass on that side. The rubber projects also on the opposite side, as seen at $c\ c'$, for the purpose of preventing the holder A from coming in contact with the glass, thus avoiding risk of breaking the same. The rubber cleaner being thus shaped to the glass, is covered with dampened paper or rag, as is usual in cleaning glasses, and inserted in the chimney, and the latter cleaned by turning the handle with one hand, while the glass is held with the other. Instead of two strips, C and C', the rubber might be in one piece, or in more than two pieces, the continuous outline whereof is made to conform to the bottle, as described.

I claim as new, and desire to secure by Letters Patent—

A cleaner for lamp-chimneys, bottles, and other articles of a similar character, consisting of strips of rubber, or other soft elastic substance, secured to a holder, and arranged in manner and for the purposes substantially as above set forth and described.

R. B. MUSSON.

Witnesses:
J. C. SEDGWICK,
WILLIAM NASH.